United States Patent
Lobbezoo et al.

[11] Patent Number: 5,224,396
[45] Date of Patent: Jul. 6, 1993

[54] BICYCLE HANDLEBAR PIVOTAL CONNECTION

[75] Inventors: Edward A. Lobbezoo, Brookfield, Ill.; Scott H. Micoley, Brown Deer, Wis.

[73] Assignee: Profile for Speed, Inc., Chicago, Ill.

[21] Appl. No.: 882,933

[22] Filed: May 14, 1992

[51] Int. Cl.⁵ .......................................... B62K 21/12
[52] U.S. Cl. ................... 74/551.3; 74/551.1; 74/551.8; 403/90; 403/344
[58] Field of Search ............... 74/551.3, 551.8, 551.1; 403/344, 90, 373; 248/288.5, 288.3

[56] References Cited

U.S. PATENT DOCUMENTS

| | | | |
|---|---|---|---|
| 153,813 | 8/1874 | Dewey | 248/288.5 X |
| 511,479 | 12/1893 | Westbrook | 403/90 X |
| 620,242 | 2/1899 | Lusebrink | 74/551.1 X |
| 2,459,371 | 1/1949 | Foster | 403/373 X |
| 4,941,481 | 7/1990 | Wagenknecht | 403/90 X |
| 5,000,469 | 3/1991 | Smith | 74/551.8 X |
| 5,062,026 | 10/1991 | Maglica et al. | 248/288.3 X |

FOREIGN PATENT DOCUMENTS

| | | | |
|---|---|---|---|
| 969223 | 12/1950 | France | 74/551.1 |
| 365000 | 11/1938 | Italy | 74/551.3 |
| 109255 | 12/1943 | Sweden | 74/551.3 |
| 395697 | 7/1933 | United Kingdom | 74/551.3 |
| 410825 | 5/1934 | United Kingdom | 403/90 |

*Primary Examiner*—Rodney H. Bonck
*Attorney, Agent, or Firm*—Kinzer, Plyer, Dorn, McEachran & Jambor

[57] ABSTRACT

A bicycle handlebar includes a main bar which is conventionally attached at its midpoint to a bicycle stem. There is a pair of auxiliary bars each having a hand-gripping portion thereon. Each auxiliary bar is attached to the main bar to provide for multi-axis movement about the main bar. The attachment for each auxiliary bar includes an adjustment member which can tighten or loosen the connection so that the location and position of each auxiliary bar suits the need of the rider of the bicycle.

2 Claims, 1 Drawing Sheet

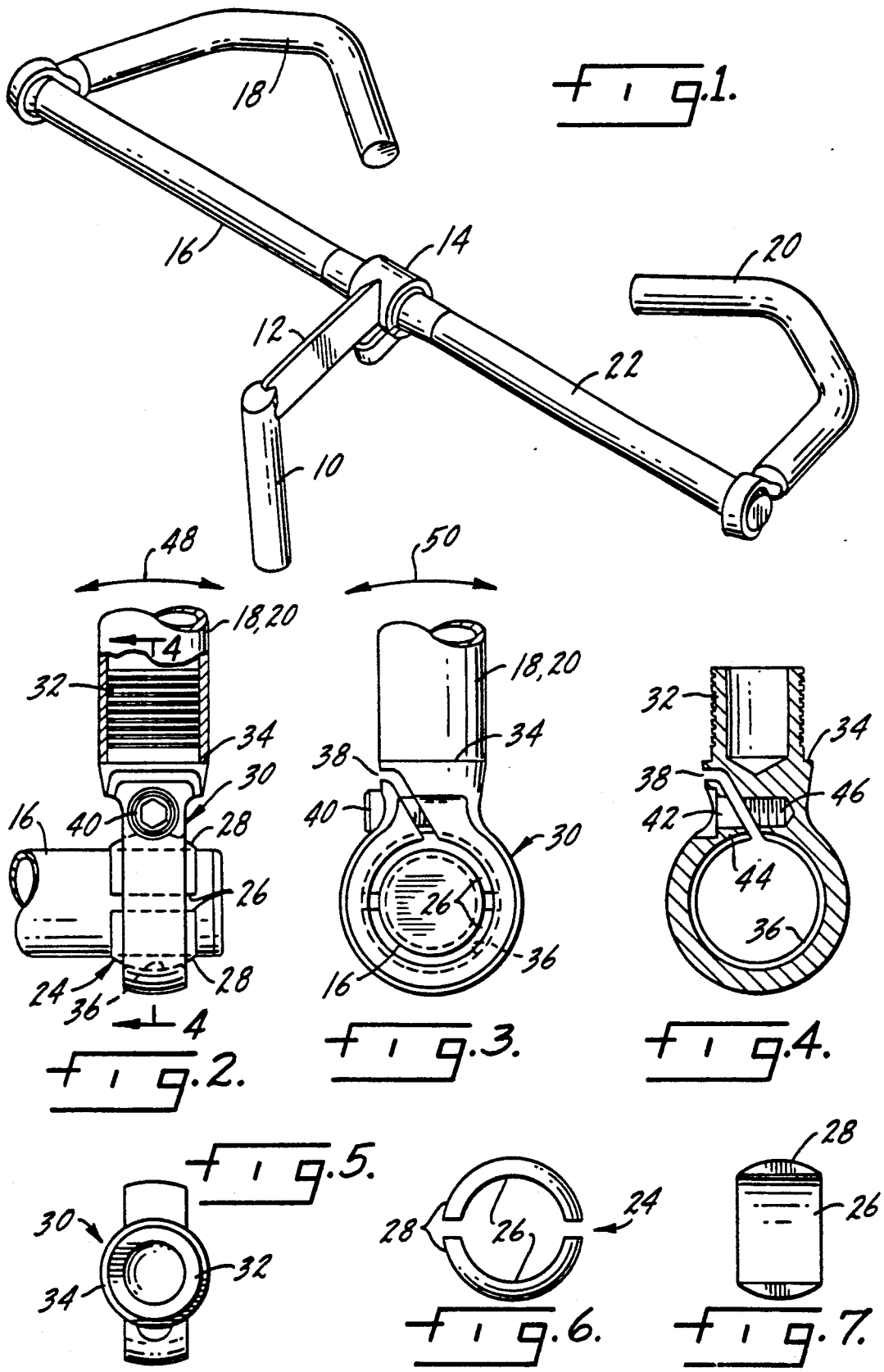

BICYCLE HANDLEBAR PIVOTAL CONNECTION

THE FIELD OF THE INVENTION

It is common in specialized forms of bicycles, particularly trail bikes, to have hand grips on the main handlebar which is attached to the bicycle stem and to have auxiliary hand grips which may either be positioned above, below or in front of the main bar. The particular hand grips of the handlebar that are used by the rider will be dictated by the particular contour over which the bike is being ridden. For climbing, one set of hand grips may be more desirable. For level riding, another set may be conventionally used. The present invention provides auxiliary handlebars which are movable about multiple axes on the main handlebar so that the hand grips on the auxiliary bar may be adjusted for a particular rider and for the particular terrain in which the rider is using the bicycle. By the use of an adjustable connection having mating spherical surfaces, it is possible to adjust the auxiliary handlebars to almost any position relative to the axis of the main handlebar.

SUMMARY OF THE INVENTION

The present invention relates to bicycle handlebars and specifically to a handlebar construction providing auxiliary hand grips which are adjustably attached to the main handlebar.

A primary purpose of the invention is a handlebar construction in which auxiliary handlebars, attached at either end of the main handlebar, can be moved about multiple axes in order to provide multiple adjustable positions for the auxiliary handlebars.

Another purpose is a handlebar construction in which each end of the main handlebar has an adjustable linkage to an auxiliary handlebar for movement into a variety of different positions.

Another purpose is a handlebar construction, including a main handlebar and a pair of auxiliary handlebars, one at each end of the main handlebar, with the auxiliary handlebars being movable about multiple axes to provide for adjustment into different positions to suit the need of the rider.

Another purpose is a simple constructed reliable handlebar construction of the type described providing auxiliary hand-gripping portions movable to a plurality of different positions.

Other purposes will appear in the ensuing specification, drawings and claims.

BRIEF DESCRIPTION OF THE DRAWINGS

The invention is illustrated diagrammatically in the following drawings wherein:

FIG. 1 is a perspective of the handlebar construction of the present invention;

FIG. 2 is a plan view, in part section, illustrating the linkage attaching an auxiliary handlebar to the main handlebar, FIG. 3 is an end view of the structure of FIG. 2, FIG. 4 is a section along plane 4—4 of FIG. 2, FIG. 5 is a top view of the linkage clamp, FIG. 6 is an end view of the linkage sleeve, and FIG. 7 is a plan view of one of the sleeve sections shown in FIG. 6.

DESCRIPTION OF THE PREFERRED EMBODIMENT

The present invention is described in connection with what is commonly known as a mountain bike, although the handlebar construction clearly is adaptable on any type of bicycle. The stem of the bicycle is indicated at 10 and has a forward arm 12 terminating in a collar 14. The collar 14 encloses the center portion of the main handlebar 16. A pair of auxiliary handlebars indicated at 18 and 20 are each attached to an end of the main bar 16. In use, there may be hand-gripping portions on the main bar 16, for example, at the location indicated at 22. Also, the auxiliary handlebars 18 and 20 will each have hand-gripping portions which may be at any location at the curved extremity of these two bars. The two bars 18 and 20 may be of any shape or configuration in the adaptation of this pivot technology.

The present invention is particularly concerned with the linkage through which the auxiliary handlebars 18 and 20 are attached to the main handlebar 16. The linkage provides for movement of each auxiliary bar about multiple axes so that each auxiliary bar can be set at any desired position by the rider. Each linkage includes a sleeve indicated generally at 24, and as particularly shown in FIGS. 2 and 6, the sleeve may be formed from two identical sleeve sections 26. Each of the sections 26 will have an interior diameter closely approximating the exterior diameter of the main bar 16 so that the sleeves may be firmly held on the main bar when the attachment mechanism is tightened as will be described hereinafter. The exterior of each sleeve section 26 has an actuate or spherical contour, the exterior surface being indicated at 28.

Each linkage includes a adjustable clamp indicated generally at 30 and having a grooved stem 32 which extends inside each auxiliary handlebar 18 and 20. When the stem 32 is fully inside its associated auxiliary handlebar, a shoulder 34 of clamp 30 will abut the end of the auxiliary handlebar. Clamp 30 has a spherical internal surface indicated at 36 which can mate with and be tightened upon the spherical exterior of sleeve sections 26. There is a slot 38 which makes the clamp interior diameter adjustable. The adjustment means is provided by a threaded screw 40 which extends through a bore 42 in clamp end 44 and extends into a threaded bore 46 in the main portion of the clamp. When screw 40 is in position, it can close gap or slot 38 thus tightening the clamp on the sleeve.

The spherical contour of the exterior surface of the sleeve and the interior surface of the clamp permit multi-axis relative movement between each auxiliary handlebar and the main handle-bar. Specifically, looking at FIG. 2, the auxiliary handlebar may be rotated in the direction of arrows 48 so that in essence the auxiliary handlebar pivots about an axis which passes diametrically through both the sleeve and the clamp and is generally perpendicular to the axis of main bar 16. In like manner, as particularly shown in FIG. 3, each auxiliary handle-bar may be pivoted about the axis of the main handlebar in the direction of arrows 50. Further, each auxiliary handlebar may be rotated toward the inside or outside.

In use, the sleeve sections will be placed upon the end portion of the main handlebar, or the sleeve sections may be positioned inside of the clamp and then the clamp slid upon the main handlebar. In either event, gap 38 provides sufficient looseness so that the elements may be assembled as illustrated in FIGS. 1 and 2. Each auxiliary handlebar may be independently moved to a desired location relative to the position of the main handlebars. Screw 40 may then be tightened, which not only reduces the inner diameter of the clamp, but also compresses the sleeve sections 26 on the end of the main handlebar. Once the screw has been tightened down, the positions of the auxiliary handlebars relative to the main handlebar are fixed and the rider can maintain that particular disposition until a change is desired. The change is brought about by merely loosening screw 40 an moving the auxiliary handlebars to the desired location and then re-tightening the screw.

Because of the spherical contours of the two elements principally forming the linkage, the sleeve sections and the clamp, the auxiliary handlebars may be positioned in an unlimited number of different positions relative to the main handlebar.

Whereas the preferred form of the invention has been shown and described herein, it should be realized that there may be many modifications, substitutions and alterations thereto.

What is claimed is:

1. A bicycle handlebar, including a main bar adapted to be connected generally at the mid-point thereof to a bicycle stem, a pair of auxiliary bars having hand-gripping portions thereon, means for attaching each auxiliary bar to an end portion of said main bar, including a sleeve mounted on each end portion of said main bar and having a generally spherical contour on the exterior thereof, an adjustable diameter clamp attached to the end of each auxiliary bar and positioned about its associated sleeve, each clamp having a generally spherical interior to mate with its associated sleeve and to provide for multi-axis movement of each auxiliary bar about its associated end portion of said main bar, each clamp having a slot therein and a threaded member for varying the size of said slot to tighten or loosen the connection between each auxiliary bar and said main bar.

2. The bicycle handlebar of claim 1 further characterized in that said sleeve is formed from a plurality of similar sleeve sections.

* * * * *